Aug. 29, 1972   G. P. DESBOIS   3,687,805
PRESSURE TUBE REACTOR FUEL BUNDLE

Filed Dec. 16, 1968   3 Sheets-Sheet 1

INVENTOR.
GERARD DESBOIS
BY C. L. Kochey
ATTORNEY

Aug. 29, 1972   G. P. DESBOIS   3,687,805
PRESSURE TUBE REACTOR FUEL BUNDLE
Filed Dec. 16, 1968   3 Sheets-Sheet 3

INVENTOR.
GERARD DESBOIS
BY  E. L. Kochey
ATTORNEY

United States Patent Office 3,687,805
Patented Aug. 29, 1972

3,687,805
PRESSURE TUBE REACTOR FUEL BUNDLE
Gerard P. Desbois, Pierrefonds, Quebec, Canada, assignor to Combustion Engineering, Inc., Windsor, Conn.
Filed Dec. 16, 1968, Ser. No. 784,129
Int. Cl. G21c 3/34
U.S. Cl. 176—78                                14 Claims

ABSTRACT OF THE DISCLOSURE

A bundle fuel element for insertion within a cylindrical guiding tube of a pressure tube reactor. A plurality of fuel rods are arranged to form a cylindrical assembly with spiders engaging the ends of the fuel rods. A spacing means in pressure contact with each of the fuel rods is located near the center of the fuel bundle. A plurality of filaments are fastened between each spider and the spacing means and are arranged to helically pass around the outside edge of the fuel rods whereby the filaments space the assembly from the guiding tube and maintain the spacer at a predetermined location.

BACKGROUND OF THE INVENTION

This invention relates to fuel elements for nuclear reactors and is concerned with the type of fuel bundle known as "cluster or bundle fuel element," which is used in the pressure tube type nuclear reactor. More particularly, it relates to spacers for separating and restraining fuel containing components within a fuel bundle, and for spacing the fuel bundle itself from the pressure tube within which is is inserted.

A fuel bundle is made of a number of cylindrical fuel rods assembled into a cylindrical assembly known as a bundle. Fuel rods are spaced apart and during operation of the reactor they are surrounded by the coolant. These fuel rods generally consist of Zircoloy tubes filled with cylindrical pellets of $UO_2$ with the tubes sealed at each end by resistant welded end caps. The fuel rods are formed into the cylindrical bundle by means of two end plates or spiders which are resistant welded to the end caps of the individual rods.

In one arrangement the required minimum spacing between the various fuel rods and also between the outer fuel rods and the pressure tube or the guiding tube is maintained by means of a Zircoloy wire wrap around the fuel rods. This wrap is wound into the form of a coarse helix around each rod and welded to the sheath of the rod at short intervals. This arrangement has operated satisfactorily under low coolant velocities, but with higher velocities vibration of the fuel rods may cause fretting of the sheath or the wire due to the continued rubbing. This arrangement involves high fabrication cost and involves the use of a large quantity of neutron absorbing material for spacing. There also is a deleterious effect on the strength of the fuel-rod sheath at the weld points.

In another arrangement small Zircoloy appendages are brazed to the fuel rod sheaths near the center and near the ends of the rods in such a manner as to maintain the minimum desired gap between the fuel rods and also between the outer fuel rods and the pressure tube. Brazing of the Zircoloy requires the handling of beryllium, which is a very toxic material and therefore requires considerable precaution, elaborate process equipment and concomitant expense. The brazing also lowers the strength of the fuel rod sheath therefore making it less suitable to resist pressure buildup within the rod due to fuel swelling and fission gas accumulation under irradiation.

SUMMARY OF THE INVENTION

The present invention deals with the problem of spacing the fuel containing rods within a fuel bundle and of providing spacing and wear components on which the bundle will slide when inserted within the guiding or pressure tube of a nuclear reactor. It avoids the disadvantages of existing arrangements by eliminating the need for welding or brazing spacing members to the thin sheaths of the fuel rods. An arrangement of continuous narrow thin strips of semi-rigid material with each formed into generally closed loops provides spacing between the fuel rods as well as between the outer-most fuel rods and the guiding or pressure tube at the midpoint. This spacing arrangement is maintained at the bundle midlength position by means of filaments fastened at one end to the spacing arrangement and at the other end to either the thick end cap or the fuel rods or to the end plate of the bundle. The continuous strips of the spacer are formed to maintain pressure contact with the fuel rods and include deformation of the strips at locations corresponding generally to the points of minimum distance between the fuel rods as well as between the outer fuel rods and the guiding tubes.

In order to provide at least a three point support between the fuel bundle and the guiding tube, the filament follows a generally helical path between the end of the fuel bundle and the spacer so that it crosses over at least one of the outer-most fuel rods. The thickness of this filament then determines the minimum spacing between the fuel rod and the guiding tube. The filaments may run parallel to the fuel rods; but in such a case, an alternate support must be supplied such as by using two spacer arrangements in a fuel bundle or by designing the end plates to provide spacing between the fuel bundle and the guiding tube.

The present invention by avoiding the need for fastening any attachment to the thin wall of the fuel element sheaths and using instead the end caps or the end plates, eliminates the risk of damaging or impairing the integrity of the fuel sheath. The invention requires a minimum amount of neutron absorbing material in the fuel bundle and decreases the cost of manufacturing the fuel element. The invention is readily adaptable to variations in the spacing, number of fuel rods, size of the fuel rods whether uniform or non-uniform, used for any particular fuel bundle design. It is also readily adaptable to variations in bundle length.

DESCRIPTION OF THE PREFERRED EMBODIMENTS

Figure 1:
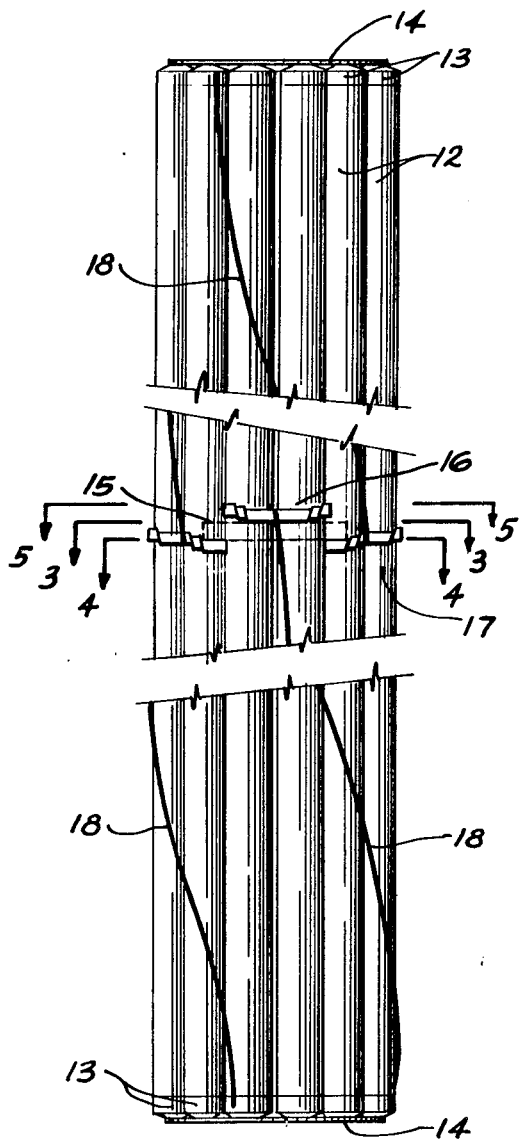
FIG. 1 is a side view of a 19 rod fuel bundle illustrating the arrangement of the spacer strips and the restraining filaments.

In FIG. 1 there is shown a fuel bundle comprised of nineteen fuel rods 12 which are arranged into two concentric circular patterns around a central rod. The fuel bundle is approximately twenty inches long and each of the rods are about 0.60 inch in diameter. The generally uniform spacing between the rods is obtained by welding the end caps 13 or each fuel rod to the spider or end plate 14 at each end of the fuel bundle. The gap between the adjacent rods is very small in the order of 0.050 inch. In order to restrain vibration of the rods and deflection of the rods, particularly when the bundle is in a horizontal position, a spacer arrangement comprised of specially designed strips 15, 16 and 17 are located at approximately the midpoint of the fuel bundle. This spacer arrangement insures minimum distance between adjacent fuel rods over all operating conditions. The strips are made of Zircoloy, but any material having a low neutron absorption cross-section would be satisfactory. The strips are only in pressure contact with the fuel rods and are arranged to exert a spring action on the fuel rods restraining their vibration. The outer strips 16 and 17 are tied to the opposite bundle extremities by means of filaments 18 in the form of wires in order to prevent longitudinal displacement of the spacer arrangement. Each wire is made of Zircoloy or any other material having a low neutron cross-section and is tied by welding, brazing or any other joining method at one end to the outer strip, wrapped over four of the outer-most fuel rods in a helical fashion with the other end fastened to the end cap of a fuel rod. The wire may be welded to this end cap without damage to the sheath, the end cap being a relatively thick member as compared to the thin walled sheath. The wrap-over wires 18 provide a wear surface for the fuel bundle when it is inserted into the reactor guiding or pressure tube and also maintain a minimum gap between the outer fuel rods and the guiding or pressure tube.

These filaments 18 preferably cross at least one of the outermost rods near the end of the fuel bundle to provide support near the ends. The use of three filaments at each end spaced about 120° apart provides support in any direction without requiring the use of a coarse helix. The use of the three filaments also provides for uniform longitudinal restraint of the spacer arrangement. The filaments may be connected in such a manner as to run parallel to the fuel rods still retaining their ability to restrain the longitudinal movement of the spacer assembly. However in such a situation, they cannot be relied upon to space the outer fuel rods from the guiding or pressure tube. Satisfactory support can in such a situation be obtained by using a minimum of two spacer assemblies on each fuel bundle, thereby providing a two point support or by designing the end plates to provide contact with the guiding tube thereby establishing a three point support.

The twenty inch long nineteen rod fuel bundle illustrated in FIG. 1 has a spacer assembly at midlength formed of a central strip 15 surrounding the seven inner fuel rods flanked on each side by the outer strips 16 and 17. Each of the outer strips 16 and 17 are tied to the opposite end of the fuel bundle by three wires 18. If a longer fuel bundle is used, a plurality of spacer arrangements may be used with the wrap around tying wires extending from the most remote outer strip of one spacer arrangement to the most remote spacer strip of the next spacer arrangement, and so on until the final filaments connect to the opposite end of the fuel bundle. More than three wires may be used although this is an unnecessary introduction of neutron absorbing material.

Figure 2:
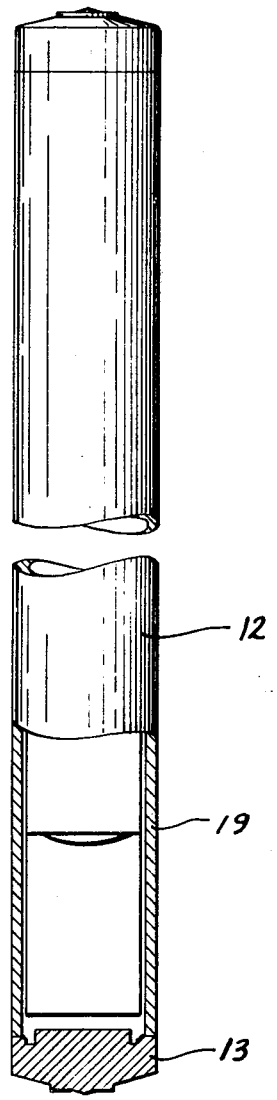
FIG. 2 is a partial sectional view of a single fuel rod illustrating the relative thicknesses of the fuel rod sheath and the end cap.

FIG. 2 is a partial sectional view of a single fuel rod 12 illustrating the thin Zircoloy fuel tube 19 and the relatively thick end cap 13 which is welded thereto. The Zircoloy wire 18 is welded to this end cap 13, thereby avoiding the deleterious weakening effect on the fuel tube which direct welding to the tube itself would have. Both the end caps 13 and the spider 14 comprise relatively heavy members to which the Zircoloy tie wire 18 may be easily welded. Welding to the end cap is preferred since this avoids any chance of the weldments interfering with engagement between the spider 14 and the refueling machine.

Figure 3:
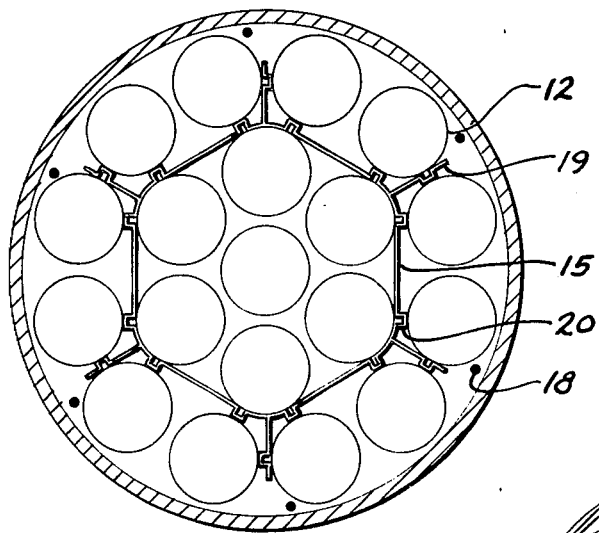
FIG. 3 is a cross-sectional view through the fuel bundle of FIG. 1 taken through section 3—3.

FIG. 3 is a cross-section through the inner strip 15 of the spacer arrangement. This inner strip is 0.020 inch thick, 0.300 inch wide, and is formed into a generally hexagon shape with round corners. At each corner of the hexagon a short extension 20 is partially cut from the central portion of the strip and is extended outwardly to act as a spacer between peripheral fuel rods. Embossments 21 on the extension and spacer strip are stamped out with these embossments extending the full width of the strip. The embossments between adjacent rods of this embodiment are not perpendicular to the strip but are inclined at a small angle. This increases the effective width of the embossments, thereby making their location less critical, and also promotes cross-flow and mixing at the point of minimum spacing. Since this introduces an offset in the initially straight strip, pairs of embossments are oppositely inclined between the point of contacts of adjacent strips. The location of these embossments corresponds to the point of minimum distance between adjacent fuel rods with their size being determined by the minimum distance between adjacent rods which has to be maintained under all operating conditions. The depth of the various embossments in any strip may be varied or required to meet varying spacing requirements.

These embossments or crimps perform two important functions. They insure a minimum distance between adjacent fuel rods which is greater than the strip thickness. In the illustrated embodiment a minimum of 0.050 inch is required with the strip being 0.020 inch thick and having embossments 0.030 inch deep. This is superior to the use of a strip 0.050 inch thick without embossments since the use of less material reduces the parasitic neutron absorption. Furthermore, the use of a thinner strip reduces the pressure drop of the coolant with flows longitudinally of the fuel rods, and permits flow through the critical narrow space in which the embossments are located.

These embossments or crimps also permit and ease the manufacturing and assembly problem. These crimps provide flexibility in the strip so that assembly of these spacers on the fuel rods is eased as compared to the use of a continuous plane strip which would have very little extensibility and therefore be difficult to fit around the fuel rods.

Figure 4:
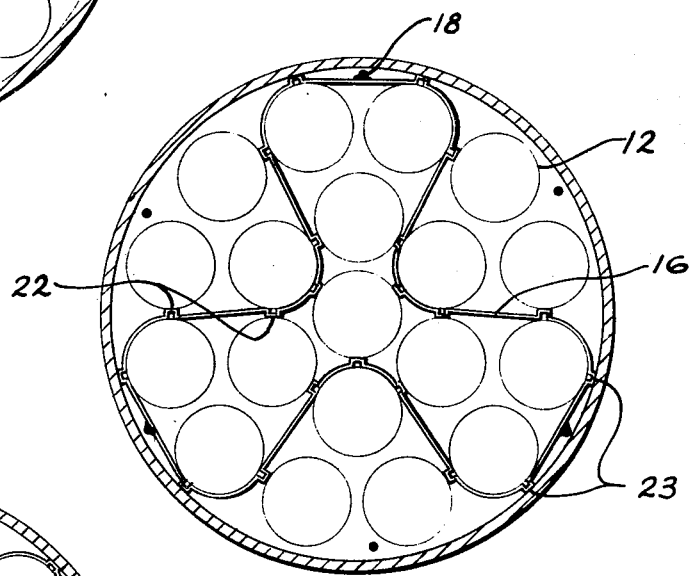
FIG. 4 is a cross-sectional view through the fuel bundle of FIG. 1 taken through section 4—4.
Figure 5:
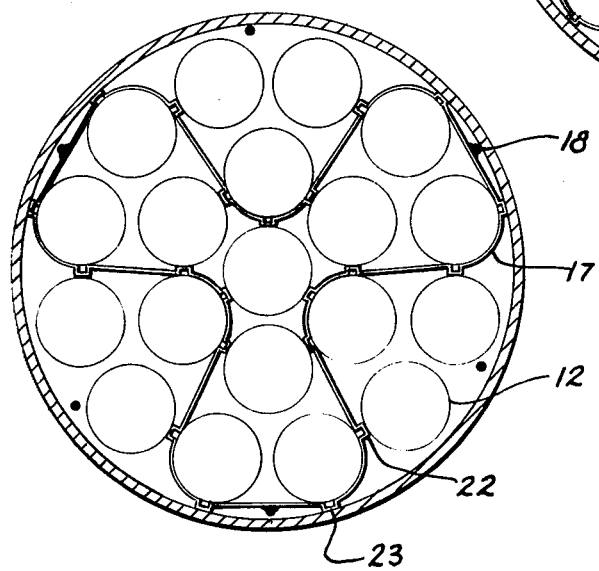
FIG. 5 is a cross-sectional view through the fuel bundle of FIG. 1 through section 5—5.

FIGS. 4 and 5 are cross-sections taken through the outer strips 16 and 17, respectively. These outer strips are only 0.200 inch wide since material is not lost from these strips due to cutouts for extensions. The two strips 16 and 17 are identical in size and shape and form into three lobe clover leaf configuration. Embossments 22 identical to those previously described for the inner strip are stamped out and are in pressure contact with adjacent fuel rods. Embossments 23 are stamped out to provide spacing guiding means between the outer-most fuel rods and the guiding or pressure tube when the fuel bundle is inside the reactor. The purpose of these embossments is identical to those described above in connection with the inner strip, and in addition they positively insure a minimum distance between the outer-most fuel rods and the guiding or pressure tube of the reactor.

Figure 6:
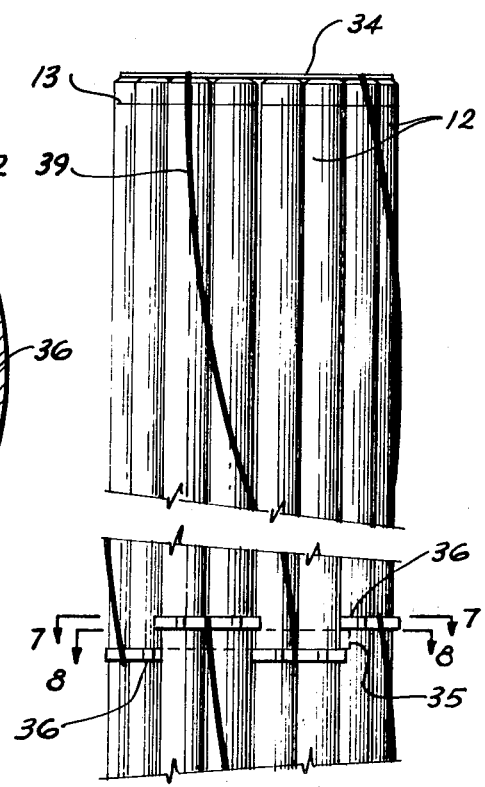
FIG. 6 is a side view of a 28 rod fuel bundle using an arrangement comprised of four spacer strips.

FIG. 6 illustrates a fuel bundle comprised of twenty-eight fuel rods 12 which are arranged into three concentric circular patterns. The end caps 13 of each rod are welded to the end plate 34 at each end to form the cylindrical fuel bundle. The spacer arrangement, which is located at approximately the midpoint of the fuel bundle, is formed in this embodiment of four specially designed strips 35, 36, 37 and 38. The outermost strips 36 and 38 are tied to the opposite ends of the fuel bundle by filaments 39 which are fastened to the spider 34, with the other end being tied to the spacer strip most remote from the respective spider. These filaments 39 are in the form of ribbons 0.050 inch thick and 0.10 inch wide. The ribbon form of filament avoids the possibility of the filament rolling while the bundle is being inserted into the pressure tube or guiding tube with the need for the ribbon arrangement being a function of the coarseness of the helix and the closeness of the fit between the fuel bundle and the pressure tube. The ribbon form of the filament is only functional where it passes over the outermost rods the shape of the remaining portion of the filament being irrelevant. The ribbon form of filament 39 has the disadvantage of including more neutron absorbing material and from this viewpoint is generally undesirable.

Figure 7:
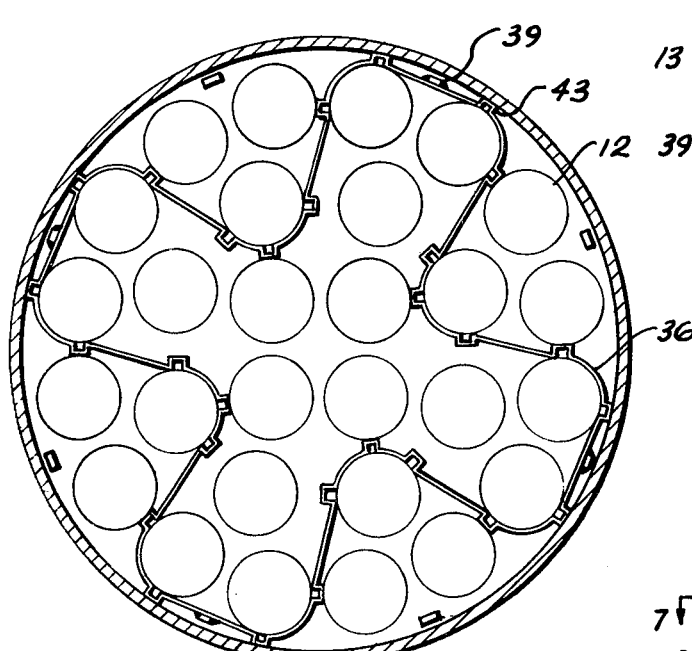
FIG. 7 is a sectional view through section 8—8 of FIG. 7.

FIG. 7 is a cross-section through strip 36 and a sectional view through strip 38 would be generally similar. The two outer strips 36 and 38 are 0.020 inch thick and 0.200 inch wide and are each formed into a continuous strip identical in size and shape and having the outline of a cross. Embossments 42 and 43 are stamped out as illustrated in the same manner and for the same purpose as described in the discussion of the first embodiment except that they are perpendicular to the strip and embossments 41 are not normally in contact with the adjacent fuel rods. The ribbon filament 39 is located on the inner edge of the strip, and this weld should be made before assembly of the bundle. Four filaments 39 are located on each end of the bundle thereby providing balanced forces on the spacer assembly.

Figure 8:
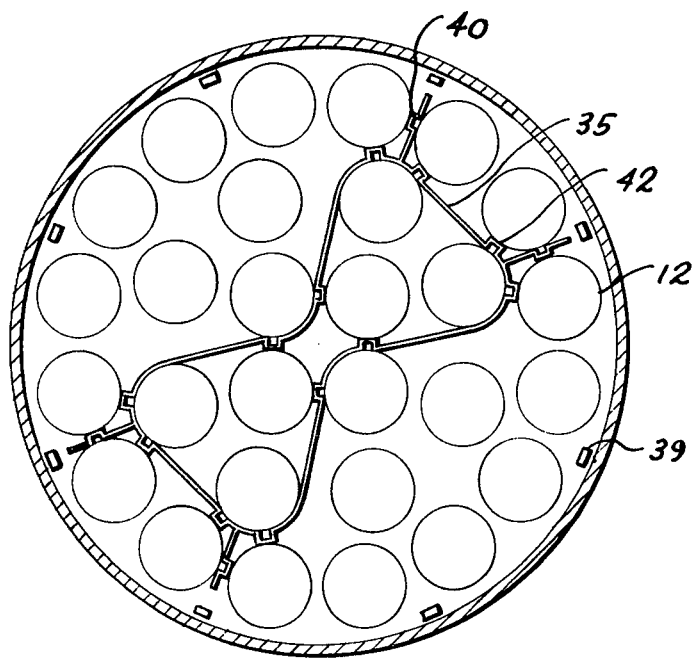
FIG. 8 is a sectional view through section 9—9 of FIG. 7.

FIG. 8 is a cross-section through strip 35 and a section through strip 37 would be similar. These two strips are 0.020 inch thick and 0.300 inch wide and are identical in size and shape. The additional width of these strips as compared to the outer strips is to provide additional width and is due to the removal of material from the main portion of the strip to provide extensions 40. At each corner a short extension 40 is partially cut from the main portion of this strip and extended out with embossments added which act as spacers between some of the outermost fuel rods. The embossments 42 are identical to those previously described and are stamped out to a depth required by the particular spacing demand.

While I have illustrated and described a preferred embodiment of my invention it is to be understood that such is merely illustrative and not restrictive and that variations and modifications may be made therein without departing from the spirit and scope of the invention. I therefore do not wish to be limited to the precise details set forth but desire to avail myself of such changes as fall within the purview of my invention.

What I claim is:

1. A bundle fuel element for insertion within a cylindrical guiding tube of a pressure tube reactor comprising: a plurality of parallel fuel rods arranged into at least two concentric circular patterns around a central rod, each fuel rod comprising a relatively thin fuel tube having a first end and a second end, said tube containing a fuel material and having relatively thick end caps sealing each end of the fuel rod; a first spider engaging the end caps of the first end of said fuel rods; a second spider engaging the end caps of the second end of said fuel rods; said first spider and the engaged end caps comprising a first heavy member; said second spider and the engaged end caps comprising a second heavy member; spacing means at a location intermediate said first and second spiders, said spacing means being in pressure contact with each of said fuel rods; longitudinal support means for said spacer means consisting of a plurality of first filaments fastened to said first heavy member and to said spacing means, and a plurality of second filaments fastened to said spacing means, and connected to said second heavy member, said filaments serving as the sole longitudinal support for said spacing means.

2. An apparatus as in claim 1 having each of said first filaments passing outwardly of and across at least one of the fuel rods in the outermost concentric circular pattern, and each of said second filaments passing outwardly of and across at least one of the fuel rods in the outermost concentric circular pattern.

3. An apparatus as in claim 2 wherein each of said filaments is fastened to the end cap portion of its respective heavy member.

4. An apparatus as in claim 2 wherein each of said filaments comprises a wire of circular cross-section.

5. An apparatus as in claim 2 wherein each of said filaments comprises a generally rectangular ribbon.

6. An apparatus as in claim 2 wherein each of said filaments passes outwardly and across at least two of the fuel rods in the outermost concentric circular pattern.

7. An apparatus as in claim 1 wherein said spacing means also includes pressure contact means for spacing the fuel element bundle from the guiding tube.

8. An apparatus as in claim 2 wherein said filament size is equal to the desired minimum spacing between the outer fuel rods and the pressure tube.

9. An apparatus as in claim 1 wherein said spacing means comprises a strip of semi-rigid material passing between the fuel rods of a thickness less than the desired minimum spacing between fuel rods and having resilient extensions in pressure contact with one of said rods between which it passes.

10. An apparatus as in claim 1 wherein said spacing means comprises at least two spacer elements; each spacer element comprising a generally continuous strip of semi-rigid material passing between some of the fuel rods, said spacer elements being displaced longitudinally of the fuel bundle but with adjacent spacer elements being in contact; said first filaments connected to the spacer element of said spacing means most remote from the first end of the fuel rods; and said second filaments connected to the spacer element of said spacing means most remote from the second end of the fuel rods.

11. An apparatus as in claim 10 wherein each of said spacer elements comprises a semi-rigid generally continuous strip passing between the fuel rods at a thickness less than desired minimum spacing between fuel rods, and having resilient extensions in pressure contact with one of said rods between which it passes.

12. An apparatus as in claim 11 wherein each of said first filaments passing outwardly of and across at least one of the fuel rods in the outermost concentric circular pattern, and each of said second filaments passing outwardly of and across at least one of the fuel rods in the outermost concentric circular pattern, and wherein said filament size is equal to the minimum desired spacing between the outer fuel rods and the guiding tube.

13. An apparatus as in claim 12 wherein each of said filaments passes outwardly of and across at least two of the fuel rods in the outermost concentric circular pattern.

14. An apparatus as in claim 13 wherein each of said filaments is fastened to the end cap portion of its respective heavy member.

References Cited

UNITED STATES PATENTS

| | | | |
|---|---|---|---|
| 3,070,534 | 12/1962 | Kooistra | 176—78 |
| 3,104,219 | 9/1963 | Sulzer | 176—78 |
| 3,137,638 | 6/1964 | Kumpf et al. | 176—78 |
| 3,281,328 | 10/1966 | Hazel et al. | 176—78 |
| 3,297,540 | 1/1967 | Williams et al. | 176—44 |
| 3,318,778 | 5/1967 | Morita | 176—78 X |
| 3,324,008 | 6/1967 | Howieson et al. | 176—76 X |
| 3,352,758 | 11/1967 | Anthony | 176—78 |

FOREIGN PATENTS

| | | | |
|---|---|---|---|
| 1,095,545 | 12/1967 | Great Britain | 176—78 |
| 1,085,975 | 6/1960 | Germany | 176—78 |

CARL D. QUARFORTH, Primary Examiner

G. G. SOLYST, Assistant Examiner

U.S. Cl. X.R.

176—79, 81